US012785923B2

(12) United States Patent
Choi et al.

(10) Patent No.: US 12,785,923 B2
(45) Date of Patent: Nov. 3, 2026

(54) APPARATUS AND METHOD WITH HOMOMORPHIC ENCRYPTION

(71) Applicant: SAMSUNG ELECTRONICS CO., LTD., Suwon-si (KR)

(72) Inventors: Rakyong Choi, Suwon-si (KR); Andrey Kim, Suwon-si (KR); Yongwoo Lee, Suwon-si (KR); Deriabin Maksim, Suwon-si (KR); Jieun Eom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 18/525,946

(22) Filed: Dec. 1, 2023

(65) Prior Publication Data

US 2024/0313945 A1 Sep. 19, 2024

(30) Foreign Application Priority Data

Mar. 17, 2023 (KR) ........................ 10-2023-0035337

(51) Int. Cl.
*H04L 9/00* (2022.01)
*H04L 9/08* (2006.01)
*H04L 9/30* (2006.01)

(52) U.S. Cl.
CPC ............ *H04L 9/008* (2013.01); *H04L 9/0861* (2013.01); *H04L 9/3093* (2013.01)

(58) Field of Classification Search
CPC ..... H04L 9/008; H04L 9/0861; H04L 9/3093; H04L 9/088
See application file for complete search history.

(56) References Cited

U.S. PATENT DOCUMENTS

| | | | | |
|---|---|---|---|---|
| 8,630,422 B2 * | 1/2014 | Gentry | .................. H04L 9/0822 713/193 |
| 11,438,148 B2 | 9/2022 | Chen | |
| 11,722,290 B2 | 8/2023 | Eom et al. | |
| 2013/0216044 A1 * | 8/2013 | Gentry | .................... H04L 9/008 380/277 |

FOREIGN PATENT DOCUMENTS

| | | |
|---|---|---|
| EP | 4 087 177 A1 | 11/2022 |
| KR | 10-2022-0157843 A | 11/2022 |

(Continued)

OTHER PUBLICATIONS

Kwak, et al. "Towards Practical Multi-key TFHE: Parallelizable, Key-Compatible, Quasi-linear Complexity." *Cryptology ePrint Archive* (Oct. 25, 2022). pp. 1-30.

(Continued)

*Primary Examiner* — Vu V Tran
(74) *Attorney, Agent, or Firm* — NSIP Law

(57) ABSTRACT

A computing apparatus and method are provided. A homomorphic encryption operation method includes dividing a ciphertext having a first number of dimensions into a plurality of ciphertexts having a second number of dimensions, converting a secret key of each of the divided ciphertexts to a joint secret key by performing a key switching operation, generating new ciphertexts by applying the joint secret key to the divided ciphertexts, and performing a blind rotation operation based on the generated ciphertexts.

20 Claims, 7 Drawing Sheets

(56) References Cited

FOREIGN PATENT DOCUMENTS

| | | | |
|---|---|---|---|
| KR | 10-2022-0157844 | A | 11/2022 |
| KR | 10-2023-0116641 | A | 8/2023 |
| KR | 10-2024-0047269 | A | 4/2024 |
| KR | 10-2024-0047280 | A | 4/2024 |

OTHER PUBLICATIONS

Leluc, Rémi, et al. *Fully Homomorphic Encryption and Bootstrapping*. Diss. IRMAR-Université Rennes 1, May 24, 2022. pp. 1-12.

Ducas, et al. "FHEW: bootstrapping homomorphic encryption in less than a second." *Annual international conference on the theory and applications of cryptographic techniques*. Berlin, Heidelberg: Springer Berlin Heidelberg, (Jan. 1, 2015). pp. 617-640.

Chillotti, Ilaria, et al. "TFHE: fast fully homomorphic encryption over the torus." *Journal of Cryptology* vol. 33 Issue. 1 (Jan. 2020): pp. 34-91.

Kim, Andrey, et al. "General bootstrapping approach for RLWE-based homomorphic encryption." *IEEE Transactions on Computers* (Sep. 27, 2021). pp. 1-28.

Alperin-Sheriff, et al.. "Faster bootstrapping with polynomial error." *Advances in Cryptology—CRYPTO 2014: 34th Annual Cryptology Conference, Santa Barbara, CA, USA, Aug. 17-21, 2014, Proceedings, Part I 34*. Springer Berlin Heidelberg, Jun. 13, 2014. pp. 1-18.

Gama, Nicolas, et al. "Structural lattice reduction: generalized worst-case to average-case reductions and homomorphic cryptosystems." *Advances in Cryptology—EUROCRYPT 2016: 35th Annual International Conference on the Theory and Applications of Cryptographic Techniques, Vienna, Austria, May 8-12, 2016, Proceedings, Part II 35*. Springer Berlin Heidelberg, Apr. 28, 2016. pp. 1-44.

Lee, Yongwoo, et al. "Efficient FHEW bootstrapping with small evaluation keys, and applications to threshold homomorphic encryption." *Annual International Conference on the Theory and Applications of Cryptographic Techniques*. Cham: Springer Nature Switzerland, Oct. 6, 2023. pp. 1-28.

Bonnoron, et al. "Large FHE gates from tensored homomorphic accumulator." *Progress in Cryptology—AFRICACRYPT 2018: 10th International Conference on Cryptology in Africa, Marrakesh, Morocco*, May 7-9, 2018, Proceedings 10. Springer International Publishing, Apr. 6, 2018. pp. 1-32.

Micciancio, et al. "Bootstrapping in FHEW-like cryptosystems." *Proceedings of the 9th on Workshop on Encrypted Computing & Applied Homomorphic Cryptography*. Oct. 23, 2022. pp. 1-27.

* cited by examiner

APPARATUS AND METHOD WITH HOMOMORPHIC ENCRYPTION

CROSS-REFERENCE TO RELATED APPLICATIONS

This application claims the benefit under 35 USC § 119(a) of Korean Patent Application No. 10-2023-0035337, filed on Mar. 17, 2023, in the Korean Intellectual Property Office, the entire disclosure of which is incorporated herein by reference for all purposes.

BACKGROUND

1. Field

The following description relates to an apparatus and method with homomorphic encryption.

2. Description of Related Art

In 2014, Ducas and Micciancio proposed a fully homomorphic encryption technique called Fastest Homomorphic Encryption in the West (FHEW). In the field of encryption, homomorphic encryption enables arbitrary operations between encrypted data while preserving the decryptability of the underlying data after the arbitrary operations. Utilizing homomorphic encryption enables arbitrary operations on encrypted data without decrypting the encrypted data. Homomorphic encryption is lattice-based and thus resistant to quantum algorithms and is generally considered a safe form of encryption.

Blind rotation operation technology is used to perform arbitrary operations on ciphertext messages in homomorphic encryption schemes. Blind rotation provides high accuracy for operation results, but has the disadvantage that public keys are significantly large.

Although various blind rotation operation techniques exist, a blind rotation operation still requires a lot of memory, and the amount of computation greatly decreases when the size of a public key necessary for a homomorphic encryption operation is reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a homomorphic encryption operation method is performed by a computing apparatus including memory and processing hardware, and the method includes: receiving, and storing in the memory, data for performing a homomorphic encryption operation, the data including or corresponding to a ciphertext having a first number of dimensions; dividing, by the processing hardware, the ciphertext having the first number of dimensions into a plurality of ciphertexts having a second number of dimensions, and string the plurality of ciphertexts in the memory; converting, by the processing hardware, a secret key of each of the divided ciphertexts to a joint secret key through a key switching operation performed by the processing hardware, and storing the joint secret key in the memory; generating, by the processing hardware, new ciphertexts by applying the joint secret key to the divided ciphertexts, and storing the new ciphertexts in the memory; and performing, by the processing hardware, a blind rotation operation based on the generated ciphertexts stored in the memory.

The dividing the ciphertext having the first number of dimensions into the plurality of ciphertexts may be based on a coefficient of the ciphertext having the first dimension and is based on a division of the first number of dimensions by the second number of dimensions.

The dividing may include: obtaining a remainder of a value obtained by dividing a coefficient of the ciphertext having the first number of dimensions by the division parameter; and dividing the ciphertext having the first number of dimensions into the plurality of ciphertexts based on the remainder.

The number of the divided ciphertexts may be the same value as the division parameter.

The second number of dimensions may be a divisor of the first number of dimensions.

A division parameter may be obtained by dividing the first number of dimension by the second number of dimensions; and based on the division parameter being two, the dividing may include: dividing the ciphertext into a first ciphertext having only even coefficients and a second ciphertext having only odd coefficients.

Based on the division parameter being two, the dividing may include: obtaining a number of slots of a plaintext; and in response to the number of the slots of the plaintext being less than or equal to half of the total slots, extracting a ciphertext having an even coefficient from the ciphertext.

The dividing may further include: generating the ciphertext having the first number of dimensions by generating a ring learning with errors (RLWE) ciphertext based on the data.

The new ciphertexts are RLWE ciphertexts having the second number of dimensions, and the performing of the blind rotation operation includes: extracting a learning with errors (LWE) ciphertext having the second number of dimensions from the new ciphertexts; and performing the blind rotation operation on the LWE ciphertext.

The performing of the blind rotation operation may include: performing a homomorphic rounding operation on the generated ciphertexts; performing a ciphertext expansion operation on the ciphertexts for which the homomorphic rounding operation is performed; and outputting an RLWE ciphertext having the first number of dimensions by performing a key switching operation on the expanded ciphertexts.

The receiving of the data may include: receiving a secret key of the ciphertext having the first number of dimensions; receiving a secret key of the divided ciphertexts; and receiving a public key for the homomorphic encryption operation.

The receiving of the public key may include: receiving a key switching key for the key switching operation; receiving a blind rotation operation key for the blind rotation operation; and receiving a ciphertext expansion key.

In another general aspect, a method of generating a key is performed by a computing apparatus including one or more processors and storage, and the method includes: generating, by the one or more processors, a secret key of a first ciphertext having a first number of dimensions, and storing the secret key of the first ciphertext in the storage; generating, by the one or more processors, a secret key of a second ciphertext having a second number of dimensions, which is generated by the one or more processors dividing the first ciphertext, and storing the secret key of the second ciphertext in the storage; generating, by the one or more processors, a key switching key for converting the secret key of the second ciphertext to a joint secret key, and storing the key switching key in the storage; generating, by the one or more processors, a blind rotation key for the joint secret key, and storing the blind rotation key in the storage; and based on a third ciphertext, generating, by the one or more processors, a ciphertext expansion key for converting the joint secret key to the secret key of the first ciphertext, wherein the third ciphertext has the second number of dimensions and is generated based on the joint secret key being expanded to a ciphertext having a first dimension.

The ciphertext expansion key may be generated based on the key ciphertext having the second number of dimensions.

In another general aspect, a homomorphic encryption operation apparatus includes: one or more processors configured to: divide a ciphertext having a first number of dimensions into a plurality of ciphertexts having a second number of dimensions, convert a secret key of each of the divided ciphertexts to a joint secret key by performing a key switching operation, generate new ciphertexts by applying the joint secret key to the divided ciphertexts, and perform a blind rotation operation based on the generated ciphertexts.

The one or more processors may be further configured to: determine a division parameter by dividing the first number of dimensions by the second number of dimensions; and divide the ciphertext having the first number of dimensions into the plurality of ciphertexts based on a coefficient of the ciphertext having the first number of dimensions and based on the division parameter.

The one or more processors may be further configured to: obtain a remainder of a value obtained by dividing a coefficient of the ciphertext having the first number of dimensions by the division parameter; and divide the ciphertext having the first number of dimensions into the plurality of ciphertexts based on the remainder.

The ciphertext may correspond to an original plaintext and the ciphertext may have been generated according to a homomorphic encryption scheme.

A homomorphic operation in the homomorphic encryption scheme may be performed for the ciphertext based on the new ciphertexts.

The new ciphertexts may include a ring learning with errors (RLWE) ciphertext having the second number of dimensions, and wherein the processor is further configured to: extract a learning with errors (LWE) ciphertext having the second dimension from the new ciphertexts; and perform the blind rotation operation on the LWE ciphertext.

Other features and aspects will be apparent from the following detailed description, the drawings, and the claims.

Figure 1A:
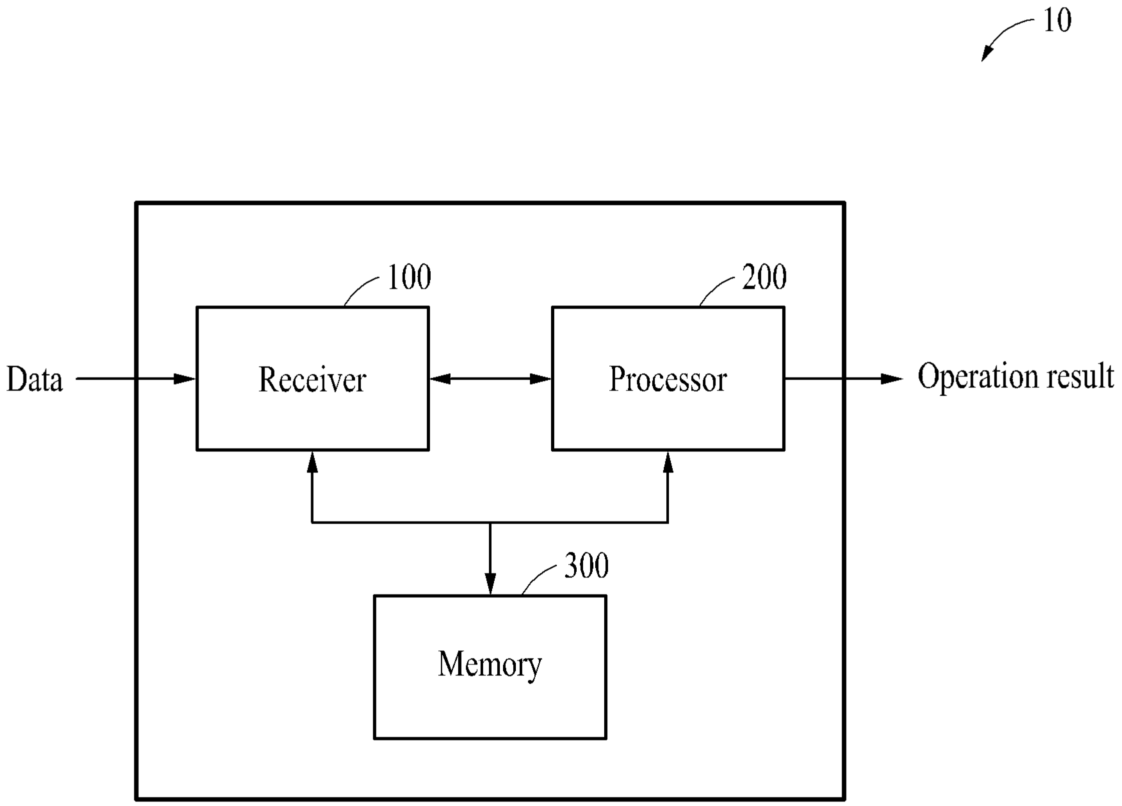
FIG. 1A illustrates an example of a homomorphic encryption operation apparatus according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1A illustrates an example of a computing apparatus according to one or more embodiments. The computing apparatus may be configured to perform homomorphic encryption operations.

Referring to FIG. 1A, a computing apparatus 10 may perform encryption and decryption using homomorphic encryption. The computing apparatus 10 may perform a blind rotation operation for a homomorphic encryption operation.

While operations of various examples and embodiments of the computing apparatus 10 are described below with reference to mathematical notation, those skilled in the art of cryptography and computer programming will appreciate that the mathematical notation is a succinct and accurate replacement of equivalent textual description. Moreover, the mathematical notation is not directly the subject of this disclosure, rather, the mathematical notation describes the operations of the computing apparatus 10 in a way that a programmer/cryptographer my readily translate into source code, circuit designs, or the like, which in turn may be readily implemented as machine instructions, physical circuits, and/or the like. Where reference is made to operations of the computing apparatus 10, a programmer/cryptographer may readily implement the described operations by suitably configuring the computing apparatus 10. Moreover, the programmer/cryptographer will understand, from the technical details provided herein, that the performance and efficiency of actual cryptographic systems employing homomorphic encryption schemes applied to data in memory may be significantly improved when they are implemented according to examples and embodiments described herein. Finally, the programmer/cryptographer will appreciate that the techniques described herein cannot practically be performed by the human mind, whether employing an aid (e.g., paper and pencil) or not. Large polynomial computations are complex, and in fact, the difficulty of various polynomial computations and operations described herein is part of what makes them suitable for cryptographic applications.

The computing apparatus 10 may generate an operation result by performing a homomorphic encryption operation. The computing apparatus 10 may perform a blind rotation operation using a secret key, ciphertext, and/or blind rotation key.

Homomorphic encryption generally allows various operations to be performed on data that is encrypted while preserving decryptability. In homomorphic encryption, a result of an operation using ciphertexts may become a new ciphertext, and a plaintext obtained by decrypting the new ciphertext may be the same as an operation result of the original data before the encryption. That is, a ciphertext may be transformed by an arbitrary operation and the thus-transformed ciphertext may still be decrypted with the same key(s) etc.

Hereinafter, encrypted data or encrypted text may be referred to as a ciphertext. The ciphertext may be encoded in the form of a polynomial or a vector including a polynomial.

In an example, the computing apparatus 10 may perform a ring learning with errors (RLWE) problem-based homomorphic encryption operation that supports an operation on a ciphertext into which a plaintext (e.g., in the form of a binary number) is encrypted. The computing apparatus 10 may perform an RLWE problem-based homomorphic encryption operation that supports an operation on a ciphertext into which a plaintext including an integer is encrypted. The computing apparatus 10 may perform an RLWE problem-based approximate homomorphic encryption operation that supports an operation on a ciphertext into which a plaintext (encoded into a real number and/or a complex number) is encrypted.

The computing apparatus 10 may derive the same result as one obtained from an operation performed on the data of a plaintext by decrypting a result obtained from an operation on the data in an encrypted state using homomorphic encryption.

The computing apparatus 10 may perform an operation on a ciphertext, and may perform a blind rotation operation (e.g., a lookup table (LUT) operation).

The computing apparatus 10 may be configured to have a smaller number of RGSW operations than existing blind rotation operations used with homomorphic encryption.

The computing apparatus 10 may have no restriction on the parameter size compared to prior art, and may provide efficient homomorphic operation through a small-sized public key by dividing a ciphertext into ciphertexts having small dimensions.

The computing apparatus 10 may perform a homomorphic operation on a ciphertext of a plaintext encoded in various forms.

The computing apparatus 10 may perform an encryption process of encrypting data to be inputted to, and processed by, privacy-preserving machine learning (PPML) and application services, for example. The computing apparatus 10 may be used in an encryption process of encrypting an input value inputted to PPML and application services.

The computing apparatus 10 may be implemented in the form of a chip and mounted on a hardware accelerator that utilizes homomorphic encryption. The computing apparatus 10 may be implemented in the form of a chip or code/instructions to reduce memory usage of various operation apparatuses. In an example, the computing apparatus 10 may reduce the amount of computation for the homomorphic encryption operation, thereby reducing the overall computational demand on the server.

In an example, the computing apparatus 10 may be applied to any RLWE problem-based homomorphic encryption, and may be used to efficiently replace homomorphic operations that require RGSW operations and perform various non-polynomial functions.

In an example, the computing apparatus 10 may be applied to any RLWE problem-based homomorphic encryption, and may also provide high cryptographic stability by adjusting the size of a secret key.

The computing apparatus 10 may be implemented in an encryption process of encrypting an input value in all devices and services that apply homomorphic encryption.

For example, the computing apparatus 10 may be applied to homomorphic encryption using blind rotation algorithms such as TFHE and FHEW.

As used herein, "encryption operation" refers to any operation within a general homomorphic encryption scheme and does not imply only a process of transforming a plaintext into a ciphertext.

A processor 200 may divide an RLWE ciphertext having N dimensions into ciphertexts each having N* dimensions, which is less dimensions than the N dimensions. The processor 200 may perform a blind rotation operation in a state in which the dimensions have been thus reduced. Thereafter, the processor 200 may change the ciphertexts with N* dimensions back into the ciphertext with N dimensions through a ciphertext expansion operation. Compared to prior art, the processor 200 may require less computation by the client and the server, require less storage space, and consume less communication bandwidth.

In a non-limiting example, the computing apparatus 10 may be implemented in a personal computer (PC), a data server, or a portable device.

The portable device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. The smart device may be implemented as a smartwatch, a smart band, or a smart ring.

In an example, the computing apparatus 10 may include a receiver 100 and a processor 200. The computing apparatus 10 may further include a memory 300.

In a non-limiting example, the receiver 100 may include a receiving interface. The receiver 100 may receive data to be subjected to a homomorphic encryption operation from the memory 300 or from outside the computing apparatus 10. The data may include operand data or a key for performing a homomorphic encryption operation. The key may include a private key and a public key, and the public key may include, for example, a key switching key for a key switching operation, a blind rotation operation key for a blind rotation operation, a ciphertext expansion key, and/or the like, but is not limited thereto. The blind rotation key may include a ring Gentry, Sahai, Waters (RGSW) ciphertext or a ring learning with errors (RLWE) ciphertext. The receiver 100 may provide the received data to the processor 200.

The processor 200 may process data stored in the memory 300. The processor 200 may execute computer-readable code (e.g., software) stored in the memory 300 and instructions triggered by the processor 200.

The processor 200 may be a data processing device implemented by hardware including a circuit having a physical structure to perform described operations. For example, the described operations may include code or instructions included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 200 may perform modulus switching by mapping a component of an input ciphertext generated from the data to an odd number.

The processor 200 may receive data for performing a homomorphic encryption operation, and divide a ciphertext having a first number of dimensions (i.e., first dimension) generated from the data into ciphertexts having a second number of dimensions (i.e., second dimension).

The processor 200 may convert a secret key of each of the divided ciphertexts into a joint secret key through a key switching operation, and may generate new ciphertexts by applying the joint secret key to the divided ciphertexts.

The processor 200 may perform a blind rotation operation based on the generated ciphertexts.

The memory 300 may store instructions (or programs) executable by the processor 200. For example, the instructions may include instructions for performing an operation of the processor 200 and/or an operation of each component of the processor 200.

The memory 300 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Blind rotation operation is a core technology used to perform an operation in RLWE-based homomorphic encryption schemes. Blind rotation operation may store function values of respective elements in a ring, where the ring is in the form of a polynomial for RLWE homomorphic encryption. Blind rotation operation may then calculate a learning with errors (LWE) ciphertext for each element, and may do so with an RGSW ciphertext of vector components of a secret key, thereby finding a desired function value. Bind rotation operation may also be used for machine learning by supporting non-linear function operations as well as linear function operations.

However, blind rotation operation is primarily used to perform arbitrary function operations on a ciphertext in a homomorphic encryption scheme. Blind rotation operation may provide high accuracy for an operation result, but may require significant memory space to store a public key. In particular, in the case of an RLWE-based homomorphic encryption scheme, since the size of an RGSW ciphertext is inversely proportional to its operation speed, when the size of the RGSW ciphertext is large, the operation speed may be slow.

As described in detail below, the computing apparatus 10 may reduce an original ciphertext to ciphertexts with fewer dimensions than the original ciphertext by taking advantage of the notion that in a process of blind rotation for an RLWE-based homomorphic encryption scheme, a decryption operation process of the given ciphertext has a multilinear structure for each secret key element-vector (an element-vector being a vector of elements representing a secret key).

Figure 1B:
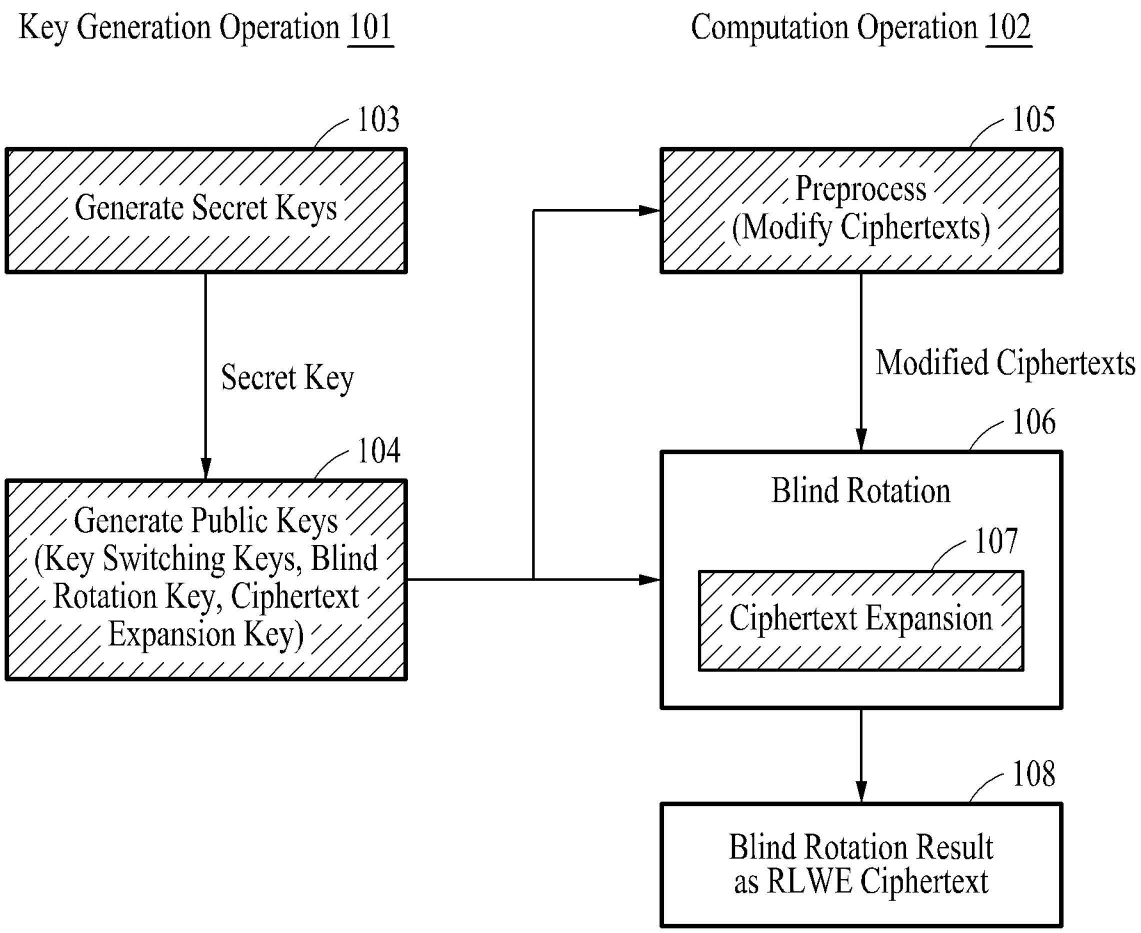
FIG. 1B illustrates an example of a homomorphic encryption operation method according to one or more embodiments.

FIG. 1B illustrates an example of a homomorphic encryption operation method according to one or more embodiments.

Referring to FIG. 1B, a homomorphic encryption operation method may include a key generation operation 101 and a computation operation 102. The key generation operation 101 may include operations 103 and 104, and the computation operation 102 may include operations 105 to 108.

The key generation operation 101 may be performed by a key generation unit, and the computation operation 102 may be performed by an operation unit. The computing apparatus 10 described with reference to FIG. 1A may include both the key generation unit and the operation unit, or only the operation unit. In an example where the computing apparatus 10 includes only the operation unit, the key generation unit may be included in a separate terminal or computing apparatus. In this example, the computing apparatus 10 including the operation unit may operate as a server, and the terminal/apparatus including the key generation unit may operate as a client cooperating with the server.

In the key generation operation 101, in order to reduce an original ciphertext to ciphertexts with fewer dimensions than the original ciphertext, the key generation unit may generate, and provide to the operation unit, a secret key, a key switching key for a key switching operation, a blind rotation operation key for a blind rotation operation, and a ciphertext expansion key. In operation 101, the operation unit may perform a blind rotation operation on an LWE ciphertext whose length has been shortened through preprocessing that reduces the ciphertext to ciphertexts with smaller dimensions by ciphertext division.

More specifically, in operation 103, the key generation unit may generate a secret key according to parameters such as the dimension of the existing ciphertext and the reduced dimension of the reduced ciphertext. The ciphertext may be an RLWE ciphertext, and, in this case, the dimension of the ciphertext may be a dimension of the ring of the RLWE.

In operation 104, the key generation unit may use the generated secret key to generate public keys that it outputs to the computation operation 102 (e.g., the operation unit). The outputted public keys may include a key switching key KS ($s_i$, s*) that makes the secret key the same in a lower dimension, a blind rotation key $RGSW_N(X^{si*})$ that is generated in the form of a ciphertext of $X^{si*}$ in an N dimension, and a ciphertext expansion key KS(s*($X^d$), s).

In operation 105, the operation unit, may perform preprocessing on the ciphertext to be operated on, which may involve classifying the ciphertext according to a value of a coefficient thereof, generating a new ciphertext, and changing the secret key to the same secret key (or a joint secret key) to perform a blind rotation operation.

In operation 106, the operation unit may extract, from the preprocessed ciphertext, an RLWE ciphertext (having an N* dimension) as an LWE ciphertext and perform the blind rotation operation therewith. The blind rotation operation may calculate an RLWE ciphertext having a larger modulus in a ring having an N dimension.

In operation 107, the operation unit may convert the ciphertexts having the secret key s* (among the ciphertexts obtained through operation 106) to have the existing secret key s, which may be done through a ciphertext expansion operation and key switching operation; thus the secret key s may be available for future operations.

In operation 108, the operation unit may output an RLWE ciphertext having an N dimension through the blind rotation of operation 106.

According to a homomorphic encryption operation method in an example, as a length of a ciphertext applied during a blind rotation operation is reduced and the RGSW operation is performed less, the speed of the blind rotation operation may be improved.

Figure 2:
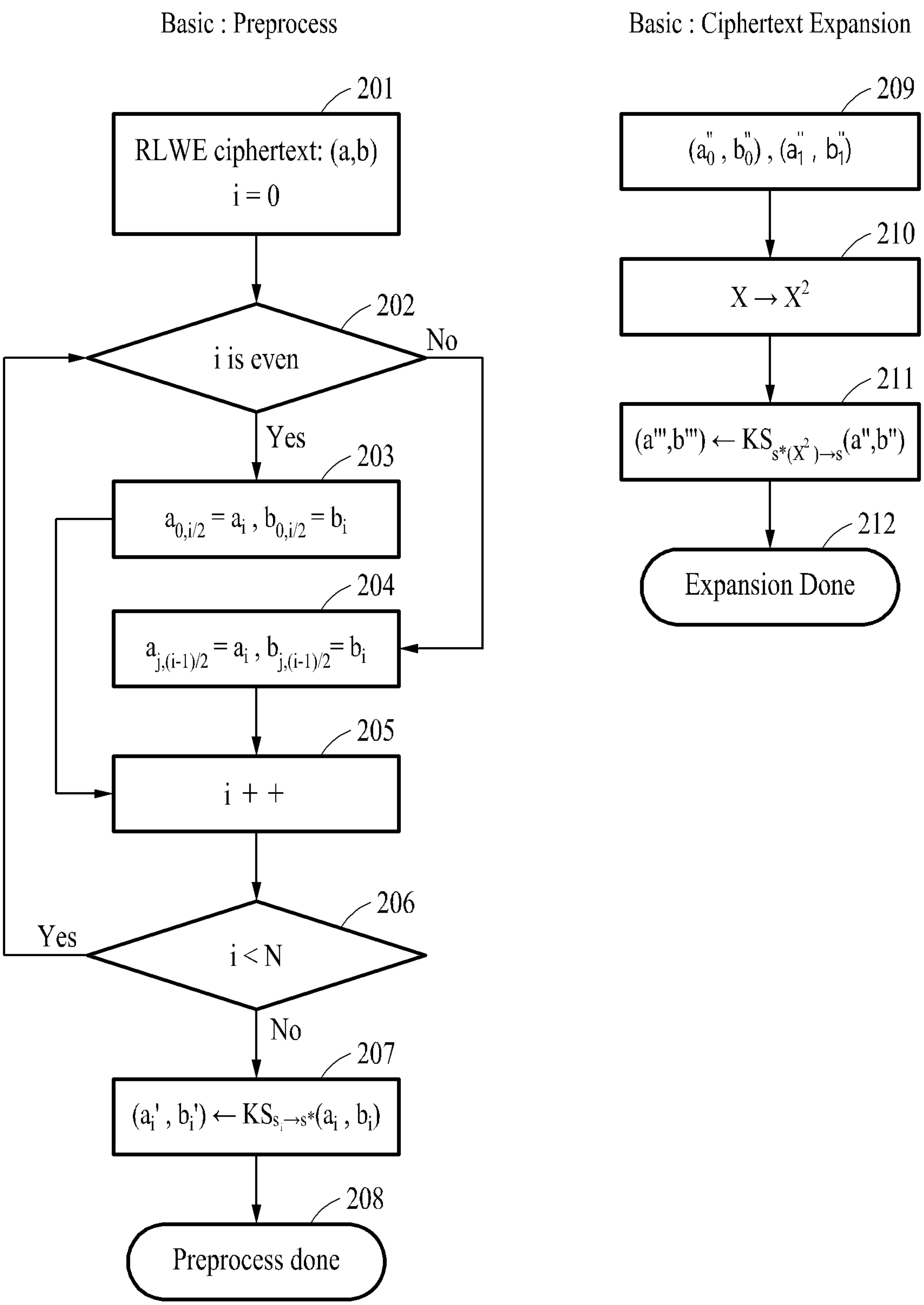
FIG. 2 illustrates an example of an operation of the homomorphic encryption operation apparatus of FIG. 1A according to one or more embodiments.

FIG. 2 illustrates an example of an operation of the computing apparatus of FIG. 1A according to one or more embodiments.

A key generation unit may, for a given N dimension, generate (i) an RLWE secret key s for an N dimension and (ii) an RLWE secret key s* for an N/2 dimension, and accordingly, generate switching keys KS($s_0$, s*), KS($s_1$, s*) in the N/2 dimension and generate a blind rotation key $$RGSW\left(X^{s_i^*}\right)$$

and a ciphertext expansion key KS(s*($X^2$),s) in the N dimension.

Referring to FIG. 2, a computing apparatus (e.g., the computing apparatus 10 of FIG. 1A) may, in a preprocessing operation, reduce a ciphertext having an N dimension to a ciphertext having an N/2 dimension before performing a blind rotation operation.

The computing apparatus may repeat operations 201 to 206 to divide an RLWE ciphertext (a, b) having a first dimension (e.g., N) into a plurality of ciphertexts having a second dimension (e.g., N/2). Here, a division parameter (number of divisions of the RLWE ciphertext) may be 2. As described next, for the loop of operations 202 to 206, a loop variable i increments from 0 to N, thus spanning the dimensions of the RLWE ciphertext. As i alternates between odd and even, coefficients of alternating odd/even terms are reduced.

In operation 202, the computing apparatus may determine whether each coefficient i is an even number, and when the coefficient i is an even number, the computing apparatus may perform operation 203, and when the coefficient i is not an even number, the computing apparatus may perform operation 204 to generate a coefficient of a ciphertext ($a_0$, $b_0$), ($a_1$, $b_1$) having an N/2 dimension.

A secret key $s_i$ of a ciphertext ($a_i$, $b_i$) generated in operations 203 and 204 by being applied to secret key s similarly to the coefficient of the ciphertext.

In operation 205, the computing apparatus may increment i by 1. In operation 206, the computing apparatus may verify whether i satisfies $i<N$, and when it does, the computing apparatus may return to operation 202 and repeat the process. On the Nth iteration, when i does not satisfy $i<N$, the computing apparatus may perform operation 207.

In operation 207, the computing apparatus may change the secret key $s_i$ for each ciphertext to the same secret key s* through $KS_{s^i \rightarrow s^*}$($s_i$, s*) to generate a new ciphertext $$(a_0', b_0'), (a_1', b_1')$$

and end the preprocessing operation through operation 208.

In operation 209, when a given ciphertext $$(a_0'', b_0''), (a_1'', b_1'')$$

is provided, the computing apparatus may perform a process of replacing a polynomial X by $X^2$ through operation 210 and thereby expand the dimension of the polynomial to N.

In operation 211, the computing apparatus may change secret key $s^*(X^2)$ of a ciphertext (a", b") to the existing secret key s through $KS(s^*(X^2),s)$ to generate a new ciphertext (a'", b'") and end the ciphertext expansion operation at operation 212.

Figure 3:
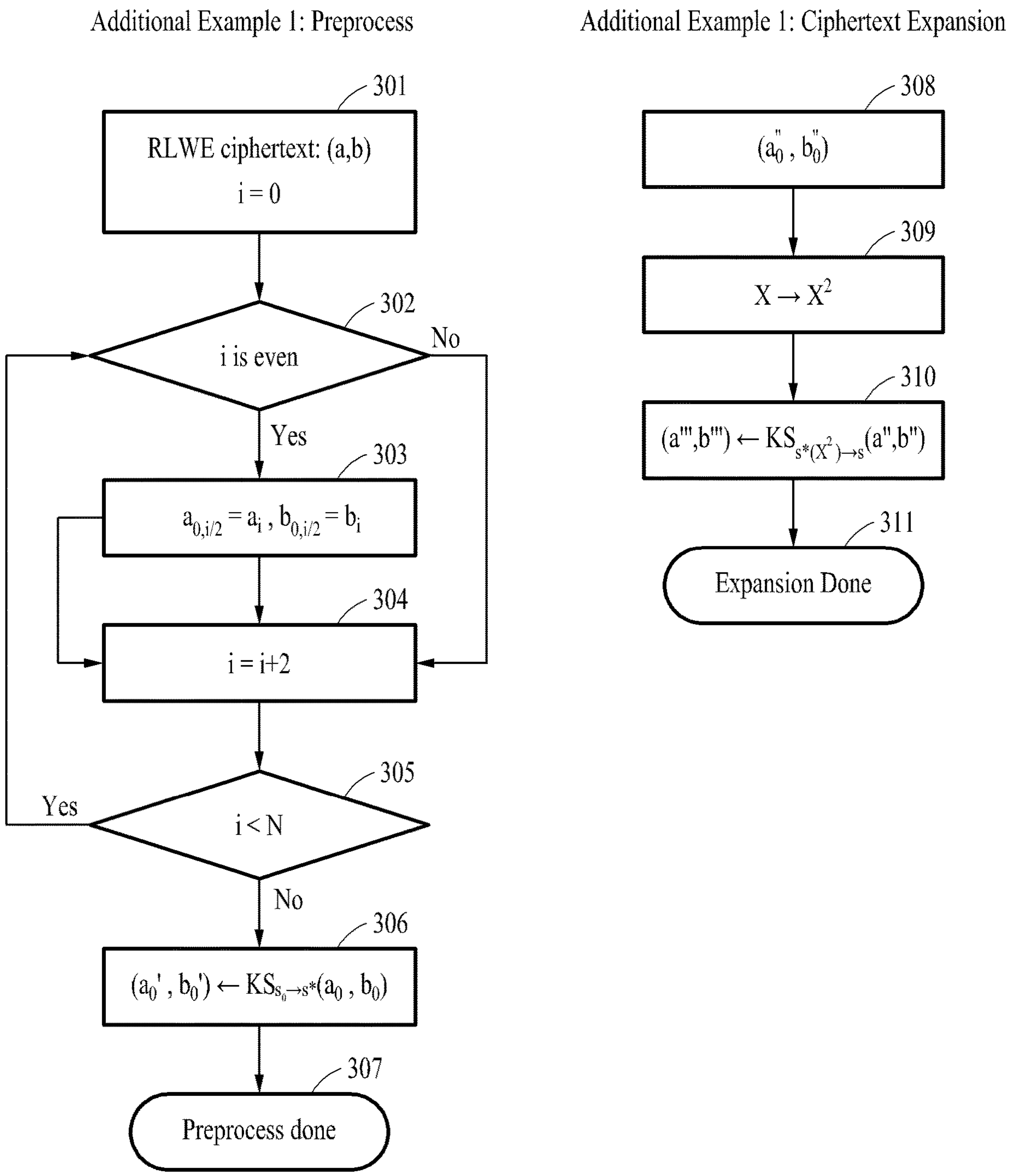
FIG. 3 illustrates another example of an operation of the computing apparatus of FIG. 1A according to one or more embodiments.

FIG. 3 illustrates another example of an operation of the computing apparatus of FIG. 1A according to one or more embodiments.

FIG. 3 illustrates a homomorphic encryption operation method when the number of slots of a plaintext that is configured through encoding a plurality of messages is less than or equal to half of the total slots. That is, FIG. 3 may be for a case where a number of slots are available for respectively encoded plaintext messages and the number of encoded messages is less than or equal to half of the number of slots.

Referring to FIG. 3, a key generation unit may (i) generate an RLWE secret key s for N dimensions and an RLWE secret key s* for N/2 dimensions when N is given as an implicit/explicit parameter, and accordingly, (ii) generate a switching key $KS(s_0, s^*)$ in the N/2 dimension and generate a blind rotation key $$RGSW\left(X^{s_i^*}\right)$$

and a ciphertext expansion key $KS(s^*(X^2),s)$ in the N dimension.

Referring to FIG. 3, a computing apparatus (e.g., the computing apparatus 10 of FIG. 1A) may reduce a ciphertext having an N dimension to a ciphertext having an N/2 dimension before performing a blind rotation operation in a preprocessing operation.

The computing apparatus may repeat operations 301 to 305 and divide an RLWE ciphertext (a, b) having a first dimension (e.g., N) into a plurality of ciphertexts having a second dimension (e.g., N/2). Here, a division parameter of dividing the first dimension by the second dimension may be 2.

When the number of slots of a plaintext is less than or equal to half of the total slots, the corresponding plaintext may have a significant value only in the case of an even coefficient, and accordingly, an operation for an odd coefficient value may be ignored. The computing apparatus generates only one key switching key, and only so, which is an even coefficient part of secret key s, may be used for a blind rotation operation.

More specifically, in operation 302, iterating over i from 0 to N−1, the computing apparatus may determine whether each coefficient i is an even number, and when the coefficient i is an even number, the computing apparatus may perform operation 303 and generate a coefficient of a ciphertext $(a_0, b_0)$ having an N/2 dimension.

A secret key of a ciphertext $(a_i, b_i)$ generated in operation 303 may be generated as $s_i$ by being applied to a secret key s similarly to the coefficient of the ciphertext.

In operation 304, the computing apparatus may increase the size of i by 2. In operation 305, the computing apparatus may verify whether i satisfies i<N, and when the new i satisfies i<N, the computing apparatus may return to operation 302 and repeat the process, and when the new i does not satisfy i<N, the computing apparatus may perform operation 306.

In operation 306, the computing apparatus may change secret key $s_i$ for each ciphertext to the same secret key s* through $K_{s^i \to s^*}(s_i, s^*)$ to generate a new ciphertext $$(a_0' b_0')$$

and end the preprocessing operation through operation 307.

In operation 308, when a given ciphertext $$(a_0'' b_0'')$$

is provided, the computing apparatus may perform a process of replacing a polynomial X by $X^2$ through operation 309, thereby expanding the dimension of the polynomial to N.

In operation 310, the computing apparatus may change the secret key $s^*(X^2)$ of a ciphertext (a", b") to the existing secret key s through $KS(s^*(X^2),s)$ to generate a new ciphertext (a'", b'"); the ciphertext expansion operation is completed at operation 311.

Figure 4:
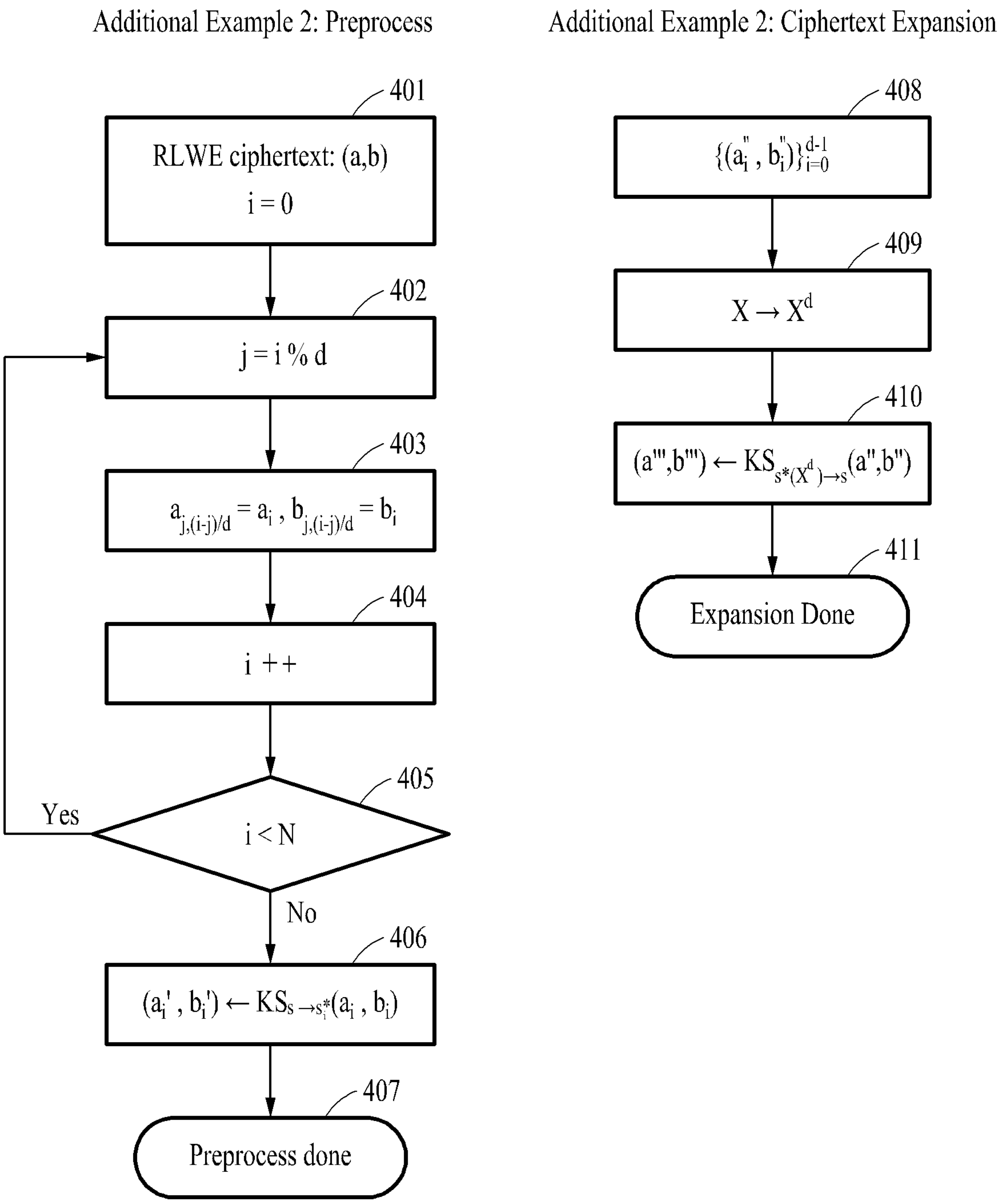
FIG. 4 illustrates another example of an operation of the homomorphic encryption operation apparatus of FIG. 1A according to one or more embodiments.

FIG. 4 illustrates another example of an operation of the computing apparatus of FIG. 1A according to one or more embodiments.

A key generation unit may generate an RLWE secret key s for N dimensions and an RLWE secret key s* for N/d dimensions (N may be a given parameter), and accordingly, generate a switching key $$\{KS(s_i, s^*)\}_{i=0}^{i=d-1}$$

with N/d dimensions, and generate a blind rotation key $$\left(X^{s_i^*}\right)$$

and a ciphertext expansion key $KS(s^*(X^d),s)$ with N dimensions.

Referring to FIG. 4, a computing apparatus (e.g., the computing apparatus 10 of FIG. 1A) may, in a preprocessing operation, reduce a ciphertext having N dimensions to a ciphertext having N/d dimensions before performing a blind rotation operation.

The computing apparatus may repeat operations 401 to 406 and divide an RLWE ciphertext (a, b) having a first dimension (e.g., N) into a plurality of ciphertexts having a second dimension (e.g., N/d).

In operation 402, the computing apparatus may determine a remainder j of a value obtained by dividing each coefficient i by a division parameter d.

In operation 403, based on the remainder j, the computing apparatus may generate d number of ciphertexts $(a_0, b_0)$, $(a_1, b_1)$, . . . $(a_{d-1}, b_{d-1})$ that have an N/d dimension.

A secret key of a ciphertext $(a_i, b_i)$ generated in operation 403 may be generated as $s_i$ by being applied to secret key s similarly to the coefficient of the ciphertext.

In operation 404, the computing apparatus may increase the size of i by 1. In operation 405, the computing apparatus may verify whether a new i satisfies i<N, and when the new i satisfies i<N, the computing apparatus may return to operation 402 and repeat the process, and when the new i does not satisfy i<N, the computing apparatus may perform operation 406.

In operation 406, the computing apparatus may change secret key $s_i$ for each ciphertext to the same secret key s* through $KS_{s^i \rightarrow s^*}(s_i, s^*)$ to generate a new ciphertext $$(a'_0 b'_0);$$

the preprocessing operation may end with operation 407.

In operation 408, when a given ciphertext $$\{(a''_0 b''_0)\}_{i=0}^{i=d-1}$$

is provided, the computing apparatus may, with operation 409, perform a process of expanding a polynomial X by replacing the polynomial with $X^d$, thus expanding the dimension to N.

In operation 410, the computing apparatus may change secret key $s^*(X^d)$ of a ciphertext (a", b") to the existing secret key s through $$KS_{s^*(X^d),s}(a''_0 b''_0)$$

to generate a new ciphertext (a'", b'"); the ciphertext expansion operation may end with operation 411.

Figure 5:
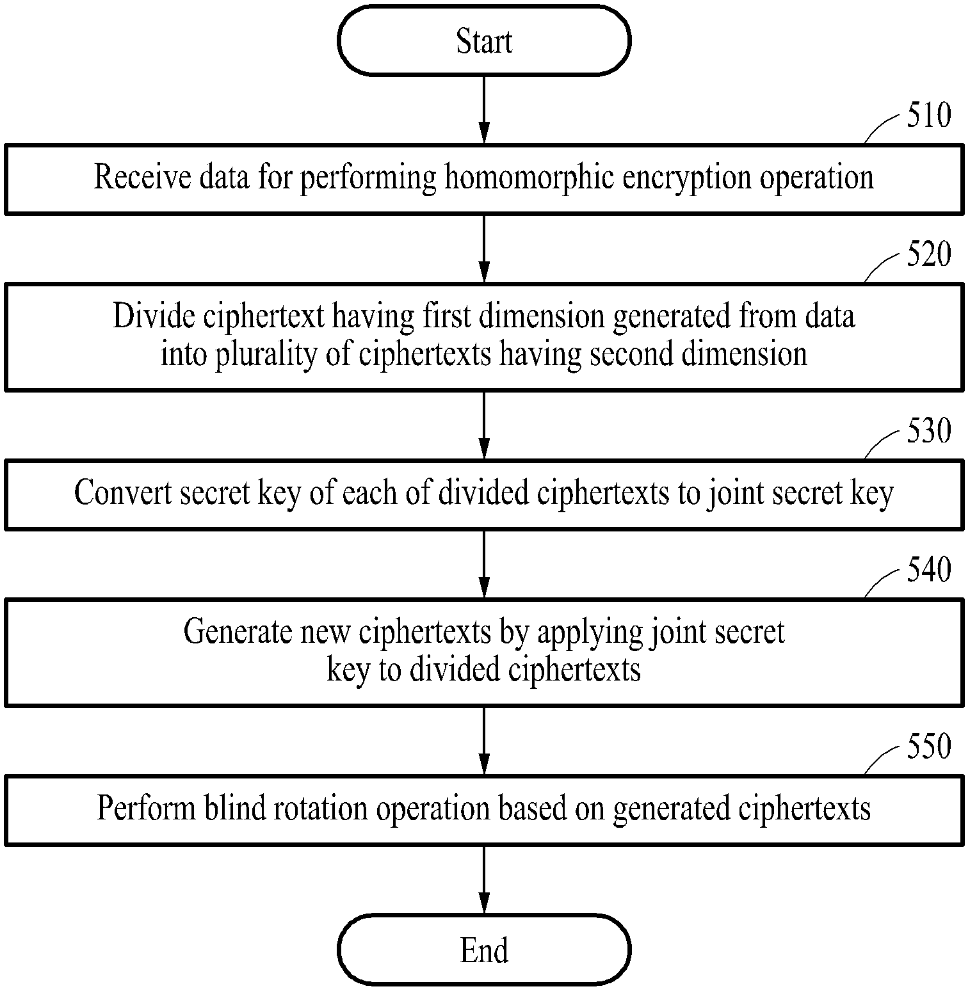
FIG. 5 illustrates an example of a homomorphic encryption operation method according to one or more embodiments.

FIG. 5 illustrates an example of a homomorphic encryption operation method according to one or more embodiments.

For ease of description, it will be described that operations 510 to 550 are performed using the computing apparatus described with reference to FIG. 1A. However, operations 510 to 550 may be performed by any suitable electronic device in any suitable system.

Referring to FIG. 5, in operation 510, the computing apparatus may receive data for performing a homomorphic encryption operation. Specifically, the computing apparatus may receive, from a key generation unit, a secret key of a ciphertext having a first dimension, a secret key of divided ciphertexts, and a public key for a homomorphic encryption operation.

In operation 520, the computing apparatus may divide a ciphertext having a first dimension generated from the data into a plurality of ciphertexts each having a second dimension. The computing apparatus may divide the first dimension by the second dimension to determine a division parameter, and divide/split the ciphertext having the first dimension into a plurality of ciphertexts based on the coefficient and the division parameter of the ciphertext having the first dimension.

For example, the computing apparatus may verify the coefficient of a ciphertext (a, b) and divide the ciphertext having the first dimension into ring elements $(a_0, b_0)$, $(a_1, b_1)$, . . . , $(a_{d-1}, b_{d-1})$ in a new N* dimension according to a remainder of a value obtained by dividing the coefficient by division parameter d. In this example, the secret key of each ciphertext $(a_i, b_i)$ is $s_i$, and a ciphertext $(a_i, b_i)$ corresponds to a plaintext mi.

In operation 530, the computing apparatus may convert a secret key of each of the divided ciphertexts into a joint secret key through a key switching operation and generate new ciphertexts by applying the joint secret key to the divided ciphertexts in operation 540. The computing apparatus may perform a key switching operation $KS(s_i, s^*)$ on a secret key of a reduced ciphertext and generate a new ciphertext $$(a'_0 b'_0), (a''_0 b''_0), \ldots, (a'_{d-1}, b'_{d-1})$$

by changing the secret key of each of the divided ciphertexts to a joint secret key s*.

In operation 550, the computing apparatus may perform a blind rotation operation based on the generated ciphertexts. The computing apparatus may extract an LWE ciphertext having a second dimension from the new ciphertexts and perform a blind rotation operation on the LWE ciphertext.

The computing apparatus may perform a homomorphic rounding operation on the generated ciphertexts, perform a ciphertext expansion operation on the ciphertexts for which the homomorphic rounding operation is performed, and perform a key switching operation on the expanded ciphertexts to output an RLWE ciphertext having the first dimension.

More specifically, the computing apparatus may perform a homomorphic rounding operation on a ciphertext $RLWE_{s^*,q}(m)$ having a modulus q and an N* dimension to generate a ciphertext $RLWE_{s^*,q'}(m)$ on a modulus q'=q/2N and a ciphertext $$(a_i^{HR}, b_i^{HR}) = RLWE^0_{s^*,2N}(-u)$$

without errors on a modulus 2N.

The computing apparatus may calculate $RLWE_{s^*(X^d)q'}(m(X^d))$ and $$(a_i^{HR}(x^d), b_i^{HR}(x^d)) = RLWE^0_{s^*,(X^d)2N}(-u(x^d))$$

with respect to the ciphertext $RLWE_{s^*,q'}(m)$ and $$(a_i^{HR}, b_i^{HR})$$

obtained by performing the homomorphic rounding operation. Here, the ciphertext may be a ciphertext having a secret key $s^*(X^d)$ in a ring of an N dimension.

The computing apparatus may perform an operation of converting a secret key $s^*(X^d)$ of $$(a_i^{HR}(x^d), b_i^{HR}(x^d))$$

to the existing secret key s.

To output a ciphertext on a modulus Q, That computing apparatus may perform a scaled modulus raising operation and a repacking operation in a ring of an N dimension using a blind rotation key $$\left(X^{s_i^*}\right),$$

and calculate a ciphertext $$\left(a_i^{SM}, b_i^{SM}\right) = RLWE_{s,Q}(-q' \cdot u)$$

having a secret key s in the ring of the N dimension.

Figure 6:
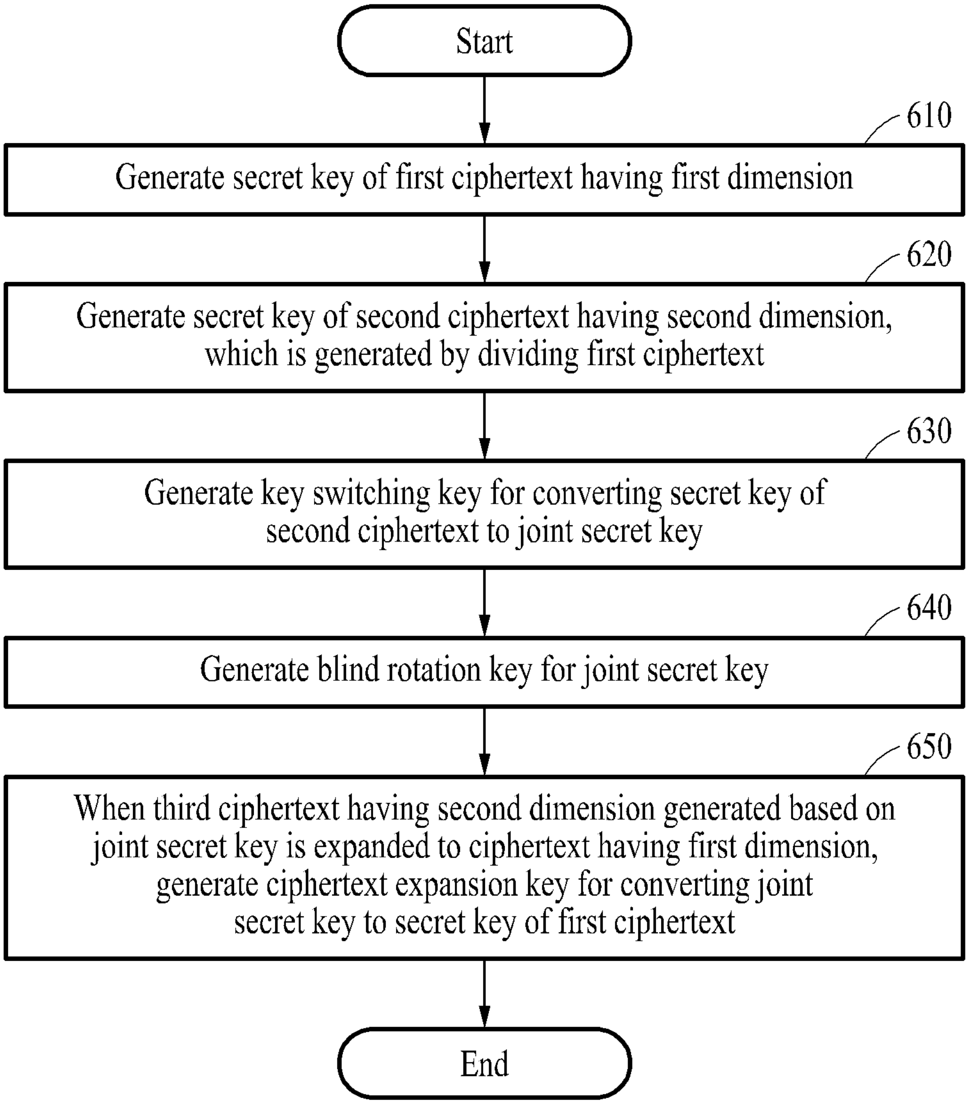
FIG. 6 illustrates an example of a method of generating a key according to one or more embodiments.

FIG. 6 illustrates an example of a method of generating a key according to one or more embodiments.

For ease of description, it will be described that operations 610 to 650 are performed using the key generation unit described with reference to FIG. 1B. However, operations 610 to 650 may be performed by any suitable electronic device in any suitable system.

Referring to FIG. 6, in operation 610, the key generation unit may generate a secret key of a first ciphertext having a first dimension, and in operation 620, the key generation unit may generate a secret key of a second ciphertext having a second dimension, which is generated by dividing or splitting the first ciphertext.

In operation 630, the key generation unit may generate a switching key $KS(s_i,s^*)$ for converting secret keys $s_0, s_1, \ldots, s_{d-1}$ of the second ciphertext to a joint secret key s*.

In operation 640, the key generation unit may generate a blind rotation key $$RGSW_{s,Q}\left(X^{s_i^*}\right)$$

with respect to the joint secret key s*.

In operation 650, when the key generation unit expands a third ciphertext having a second dimension (and having been generated based on the joint secret key to a ciphertext having the first dimension). The key generation unit may generate a ciphertext expansion key for converting the joint secret key to the secret key of the first ciphertext. For example, when the key generation unit expands an RLWE ciphertext having an N* dimension to an RLWE ciphertext having an N dimension, the key generation unit may generate a ciphertext expansion key $KS(s^*(X^d),s)$ for returning a secret key $s^*(X^d)$ to the existing secret key s.

The computing apparatuses, the cryptographic systems, the electronic devices, the processors, the memories, the displays, the information output system and hardware, the storage devices, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A homomorphic encryption operation method for a homomorphic encryption scheme, the method performed by a computing apparatus comprising memory and processing hardware, the method comprising:

receiving, and storing in the memory, data for performing a homomorphic encryption operation, the data comprising or corresponding to a ciphertext having a first number of dimensions, the ciphertext comprising an encryption, of a message, according to the homomorphic encryption scheme;

dividing, by the processing hardware, the ciphertext having the first number of dimensions into a plurality of ciphertexts having a second number of dimensions, and storing the plurality of ciphertexts in the memory;

converting, by the processing hardware, a secret key of each of the divided ciphertexts to a joint secret key through a key switching operation performed by the processing hardware, and storing the joint secret key in the memory;

generating, by the processing hardware, new ciphertexts by applying the joint secret key to the divided ciphertexts, and storing the new ciphertexts in the memory;

performing, by the processing hardware, a blind rotation operation based on the generated ciphertexts stored in the memory; and based on a result of the blind rotation operation, performing a decryption.

2. The method of claim 1, wherein the dividing the ciphertext having the first number of dimensions into the plurality of ciphertexts is based on a coefficient of the ciphertext having the first dimension and is based on a division of the first number of dimensions by the second number of dimensions.

3. The method of claim 2, wherein the dividing comprises:

obtaining a remainder of a value obtained by dividing a coefficient of the ciphertext having the first number of dimensions by the division parameter; and dividing the ciphertext having the first number of dimensions into the plurality of ciphertexts based on the remainder.

4. The method of claim 2, wherein the number of the divided ciphertexts has the same value as the division parameter.

5. The method of claim 1, wherein the second number of dimensions is a divisor of the first number of dimensions.

6. The method of claim 2, wherein, a division parameter is obtained by dividing the first number of dimension by the second number of dimensions;

based on the division parameter being two, the dividing comprises:

dividing the ciphertext into a first ciphertext having only even coefficients and a second ciphertext having only odd coefficients.

7. The method of claim 6, wherein, based on the division parameter being two, the dividing comprises:

obtaining a number of slots of a plaintext; and in response to the number of the slots of the plaintext being less than or equal to half of the total slots, extracting a ciphertext having an even coefficient from the ciphertext.

8. The method of claim 1, wherein the dividing further comprises:

generating the ciphertext having the first number of dimensions by generating a ring learning with errors (RLWE) ciphertext based on the data.

9. The method of claim 1, wherein the new ciphertexts are RLWE ciphertexts having the second number of dimensions, and the performing of the blind rotation operation comprises:

extracting a learning with errors (LWE) ciphertext having the second number of dimensions from the new ciphertexts; and performing the blind rotation operation on the LWE ciphertext.

10. The method of claim 1, wherein the performing of the blind rotation operation comprises:

performing a homomorphic rounding operation on the generated ciphertexts;

performing a ciphertext expansion operation on the ciphertexts for which the homomorphic rounding operation is performed; and outputting an RLWE ciphertext having the first number of dimensions by performing a key switching operation on the expanded ciphertexts.

11. The method of claim 1, wherein the receiving of the data comprises:

receiving a secret key of the ciphertext having the first number of dimensions;

receiving a secret key of the divided ciphertexts; and receiving a public key for the homomorphic encryption operation.

12. The method of claim 11, wherein the receiving of the public key comprises:

receiving a key switching key for the key switching operation;

receiving a blind rotation operation key for the blind rotation operation; and receiving a ciphertext expansion key.

13. A method of generating a key to be used in a homomorphic encryption scheme, the method performed by a computing apparatus comprising one or more processors and storage, the method comprising:

generating, by the one or more processors, a secret key of a first ciphertext having a first number of dimensions, and storing the secret key of the first ciphertext in the storage, the first ciphertext comprising an encryption, of a message, according to the homomorphic encryption scheme;

generating, by the one or more processors, a secret key of a second ciphertext having a second number of dimensions, which is generated by the one or more processors dividing the first ciphertext, and storing the secret key of the second ciphertext in the storage;

generating, by the one or more processors, a key switching key for converting the secret key of the second ciphertext to a joint secret key, and storing the key switching key in the storage;

generating, by the one or more processors, a blind rotation key for the joint secret key, and storing the blind rotation key in the storage; and based on a third ciphertext, generating, by the one or more processors, a ciphertext expansion key for converting the joint secret key to the secret key of the first ciphertext, wherein the third ciphertext has the second number of dimensions and is generated based on the joint secret key being expanded to a ciphertext having a first dimension and;

recovering the message with a decryption operation of the homomorphic encryption scheme based on the third ciphertext.

14. The method of claim 1, wherein the ciphertext expansion key is generated based on the key ciphertext having the second number of dimensions.

15. A homomorphic encryption operation apparatus, the apparatus comprising:

one or more processors configured to:

divide a ciphertext having a first number of dimensions into a plurality of ciphertexts having a second number of dimensions, convert a secret key of each of the divided ciphertexts to a joint secret key by performing a key switching operation, generate new ciphertexts by applying the joint secret key to the divided ciphertexts, and perform a blind rotation operation based on the generated ciphertexts.

16. The apparatus of claim 15, wherein the one or more processors are further configured to:

determine a division parameter by dividing the first number of dimensions by the second number of dimensions; and divide the ciphertext having the first number of dimensions into the plurality of ciphertexts based on a coefficient of the ciphertext having the first number of dimensions and based on the division parameter.

17. The apparatus of claim 16, wherein the one or more processors are further configured to:

obtain a remainder of a value obtained by dividing a coefficient of the ciphertext having the first number of dimensions by the division parameter; and divide the ciphertext having the first number of dimensions into the plurality of ciphertexts based on the remainder.

18. The apparatus of claim 15, wherein the ciphertext corresponds to an original plaintext and wherein the ciphertext has been generated according to a homomorphic encryption scheme.

19. The apparatus of claim 18, wherein a homomorphic operation in the homomorphic encryption scheme is performed for the ciphertext based on the new ciphertexts.

20. The apparatus of claim 15, wherein the new ciphertexts comprise a ring learning with errors (RLWE) ciphertext having the second number of dimensions, and wherein the processor is further configured to:

extract a learning with errors (LWE) ciphertext having the second dimension from the new ciphertexts; and perform the blind rotation operation on the LWE ciphertext.

* * * * *